(12) United States Patent
Liao

(10) Patent No.: US 6,305,660 B1
(45) Date of Patent: Oct. 23, 2001

(54) BRACKET HAVING A RELEASABLE LOCKING MEANS

(75) Inventor: Nien Chiang Liao, Lu-Chou (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 09/597,883

(22) Filed: Jun. 20, 2000

(51) Int. Cl.[7] ................................................ F16M 11/00
(52) U.S. Cl. ...................... 248/694; 312/223.2; 361/685
(58) Field of Search .............................. 248/694, 231.9; 312/223.1, 223.2; 361/685, 684, 683

(56) References Cited

U.S. PATENT DOCUMENTS

| | | | |
|---|---|---|---|
| 5,694,290 | * 12/1997 | Chang | 361/685 |
| 5,755,497 | * 5/1998 | Chang | 312/223.2 |
| 6,069,789 | * 5/2000 | Jung | 361/684 |
| 6,231,145 | * 5/2001 | Liu | 312/223.2 X |

* cited by examiner

Primary Examiner—Ramon O. Ramirez
(74) Attorney, Agent, or Firm—Wei Te Chung

(57) ABSTRACT

A bracket assembly has a releasable locking mechanism for fixing an external storage device having a positioning hole therein. The bracket assembly comprises a U-shaped bracket having a bottom and two side walls extending from the bottom. Each side wall defines a locking hole therein and having a tab formed beside the locking hole. The releasable locking mechanism comprises a cap and a pin-contained member movably received in the cap. The pin-contained member has a pin extending out of the cap which has a flange extends from a peripheral wall thereof. The locking pin of the releasable locking mechanism is movably retained in the locking hole of the bracket and the positioning hole of the storage device. The flange of the cap is detachably engaged with the tab of the bracket by moving the cap with respect to the pin-contained member.

12 Claims, 9 Drawing Sheets

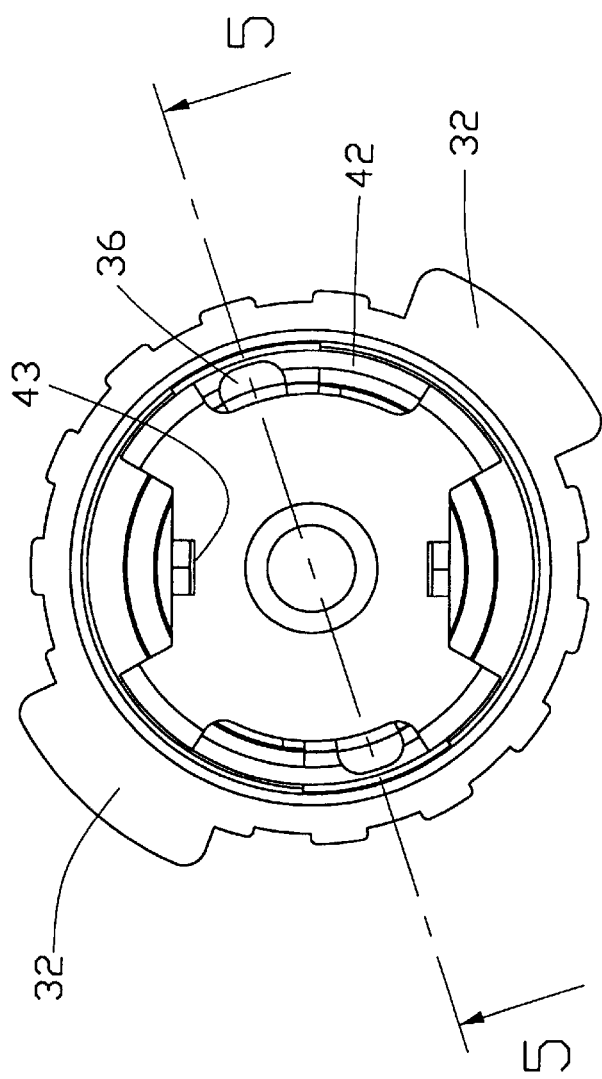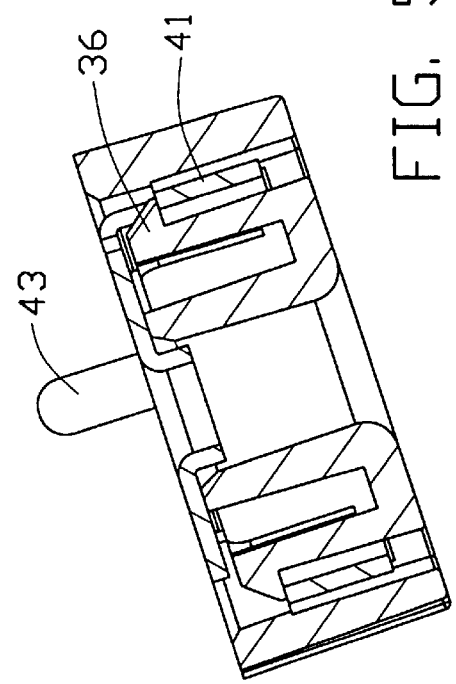

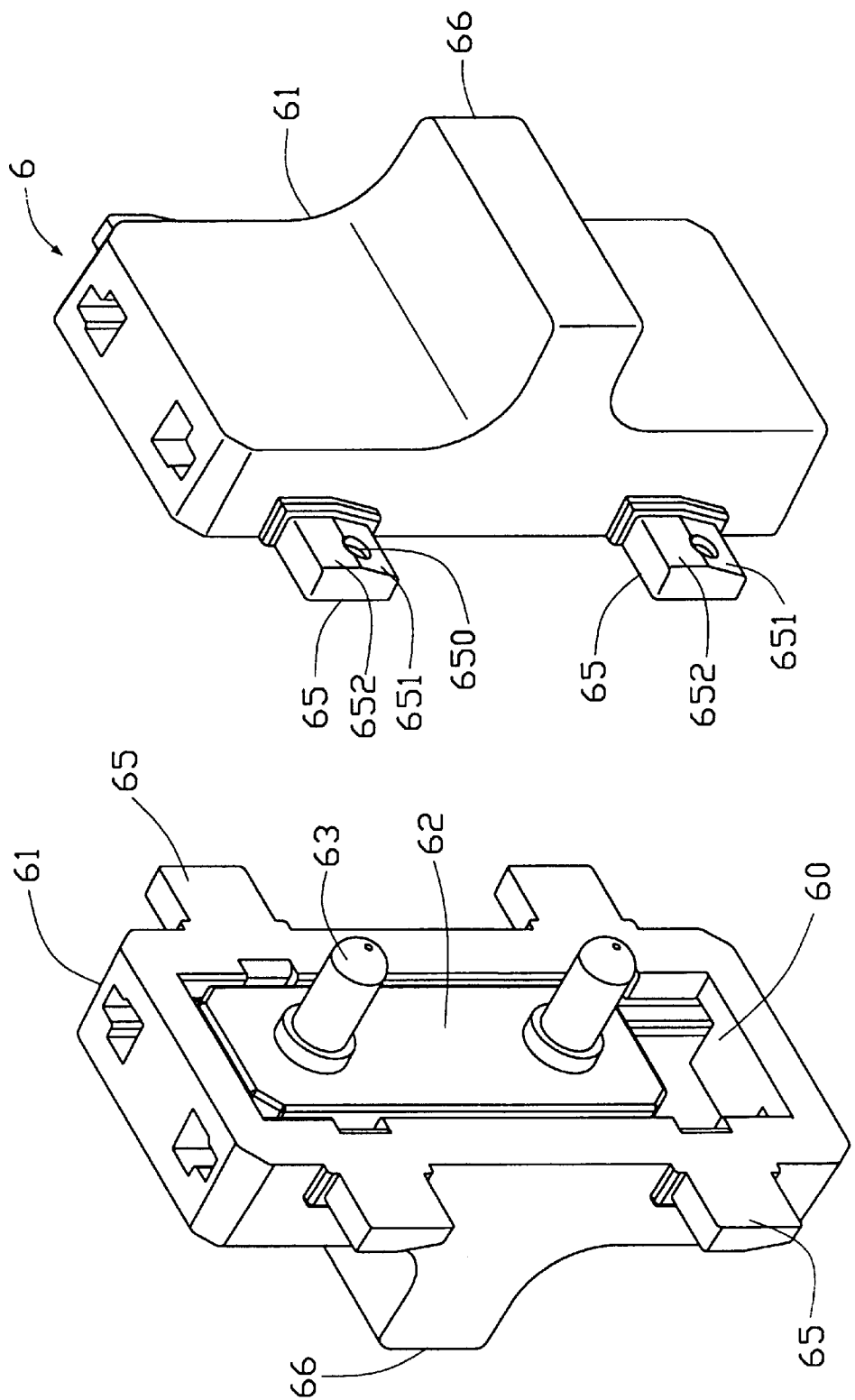

US 6,305,660 B1

BRACKET HAVING A RELEASABLE LOCKING MEANS

BACKGROUND OF THE INVENTION

1. Field of the Invention

The present invention relates to a bracket for fixing a storage device, more particularly, to a bracket having a releasable locking means for easily assembling/disassembling the storage device to/from the bracket.

2. The Prior Art

Brackets have been used in personal computers for fixing a storage device such as a compact disk driver or a hard disk driver thereto. Conventionally, the storage device is fixed to the bracket via screws with the aid of a screwdriver. However, it is not convenient to release the screws when the storage device is needed to be replaced with a new one. This is because a screwdriver is always needed for assembling/disassembling the storage device to/from the bracket. It is requisite to provide a new bracket having a fixing member by which a technician can easily assemble/disassemble the storage device to/from the bracket without the requirement of a screwdriver.

SUMMARY OF THE INVENTION

The primary purpose of the present invention is to provide a new bracket having a fixing member by which a storage device such as a compact disk driver can be assembled/disassembled to/from the bracket easily without the need of a screwdriver thereby conserving the assembling/disassembling time.

According to one aspect of the present invention there is provided a bracket assembly having a releasable locking means for fixing an external storage device having a positioning hole therein. The bracket assembly comprises a U-shaped bracket having a bottom and two side walls extending from the bottom. Each side wall defines a locking hole therein and having a tab formed beside the locking hole. The releasable locking means comprises a cap and a pin-contained member movably received in the cap. The pin-contained member has a pin extending out of the cap which has a flange extends from a peripheral wall thereof. The locking pin of the releasable locking means is movably retained in the locking hole of the bracket and the positioning hole of the storage device. The flange of the cap is detachably engaged with the tab of the bracket by moving the cap with respect to the pin-contained member.

BRIEF DESCRIPTION OF THE DRAWINGS

FIG. 4 is a plan view of the first locking means of FIG. 3;

FIG. 5 is a cross-sectional view of FIG.4 taken from a phantom line 5—5 thereof

FIG. 10 is a perspective view of a second locking means of FIG. 9;

FIG. 11 another perspective view of the second locking means of FIG. 10; and

DETAILED DESCRIPTION OF THE PREFERRED EMBODIMENT

Figure 1:
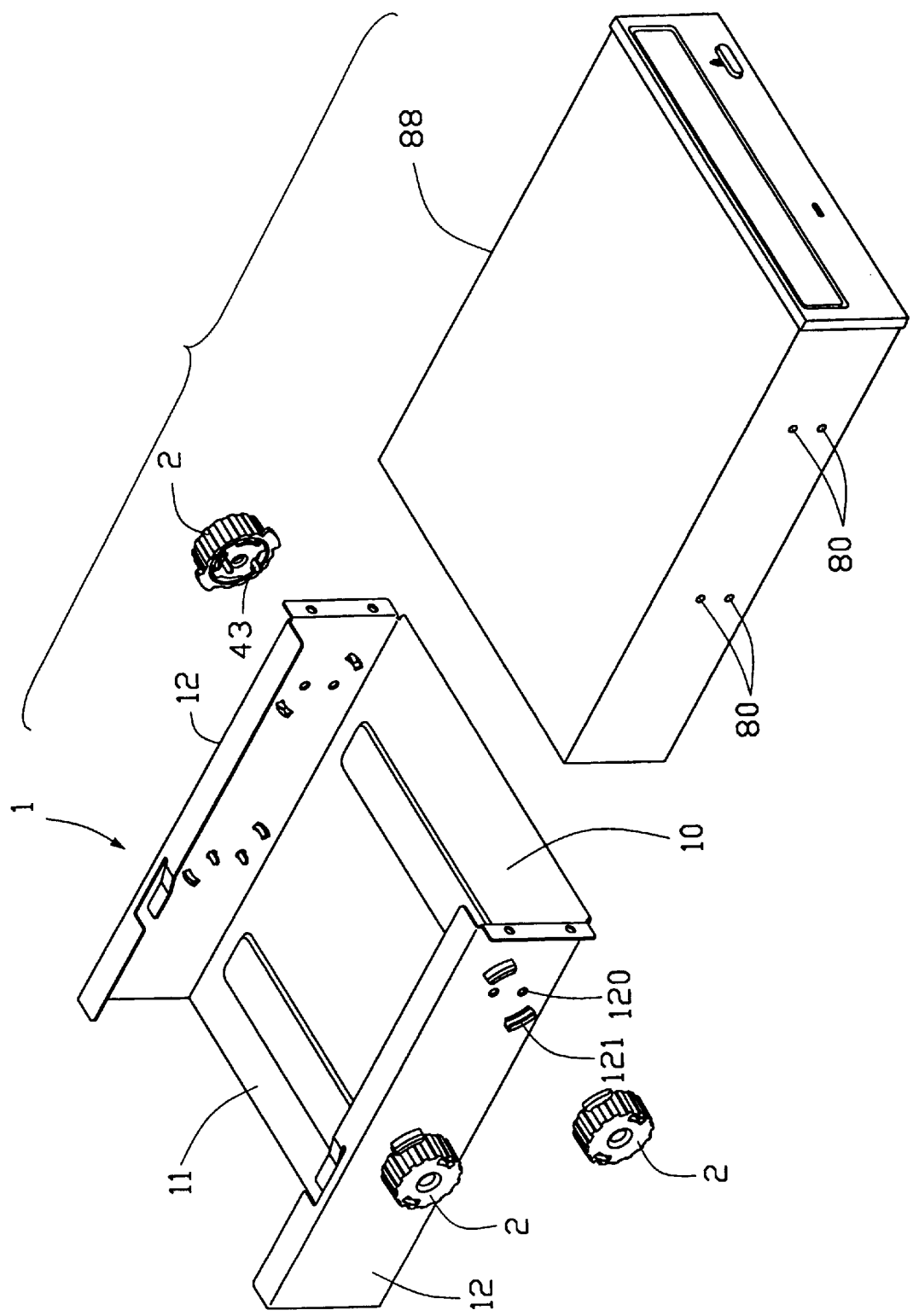
FIG. 1 is exploded view of a bracket in accordance with the present invention and an external storage device to be engaged with the bracket.

Referring to FIG. 1, a bracket 1 in accordance with a first embodiment of the present invention is shown in exploded view and an external storage device 88 such as a compact disk driver is also shown for being fixed to the bracket 1. The bracket 1 is a substantially U-shaped structure having a bottom 11 and two opposite side walls 12 extending upward from edges of the bottom 11 and a reception space 10 is defined therebetween. Two sets of positioning holes 120 are defined in the side wall 12. Two positioning tabs 121 are formed around each set of the positioning holes 120. Four first locking means 2 are used to fix the storage device 88 to the bracket 1. Two sets of fixing holes 80 are defined in one side of the storage device 88 and also an opposite side thereof as well. The positioning holes 120 and the fixing holes 80 are so located that they can be registered with each other when the storage device 88 is slid into the reception space 10 of the bracket 1. The first locking means 2 has two locking pins 43 extending therefrom for insertion into the registered holes 120, 80 thereby fixing the storage device 88 to the bracket 1.

Figure 2:
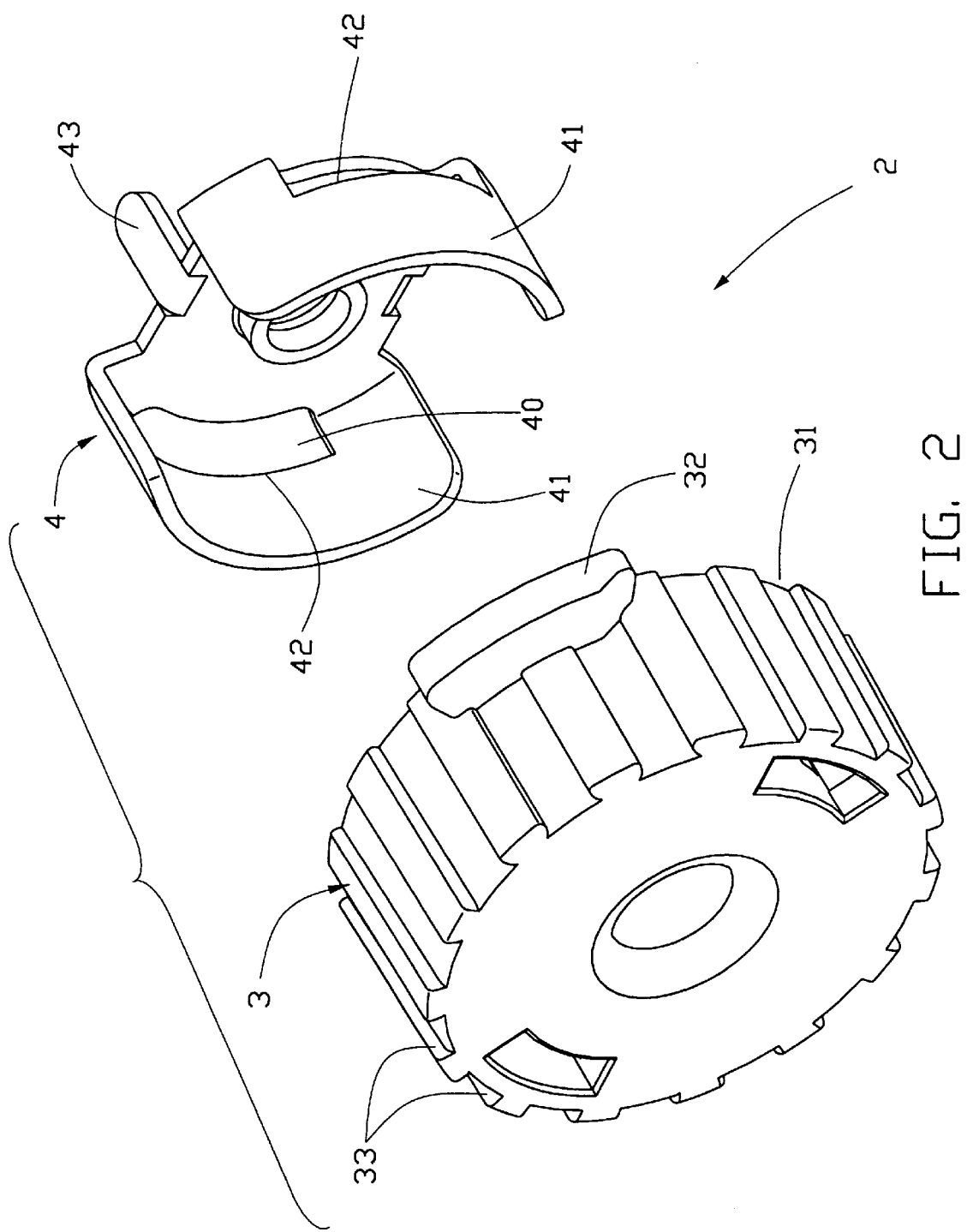
FIG. 2 is an exploded view of a first locking means of the bracket of FIG. 1.

Referring to FIG. 2, the first locking means 2 comprises a plastic cap 3 and a pin-contained member 4 adapted to be rotatably received in the cap 3. The cap 3 comprises a circular periphery 31 on which a plurality of ribs 33 are formed for increasing friction for ease of operation when a technician rotates the knob 2 during assembling or disassembling procedure. Two flanges 32 are formed in axially opposite sections of the circular periphery 31 and sized to be engageable with the positioning tab 121 of the bracket 1 of FIG. 1. The pin-contained member 4 is made of metal and sized to be receivable and rotatable in the cap 3. The pin-contained member 4 comprises a plate 45, two opposite side walls 41 extending perpendicularly from the plate 45, and two locking pins 43 extending in opposite direction to which the wall 41 extends. One slot 40 is defined between each side wall 41 and the plate 45, i.e., a portion of the side wall 41 and a portion of the plate 45 are removed to form the slot 40.

Figure 3:
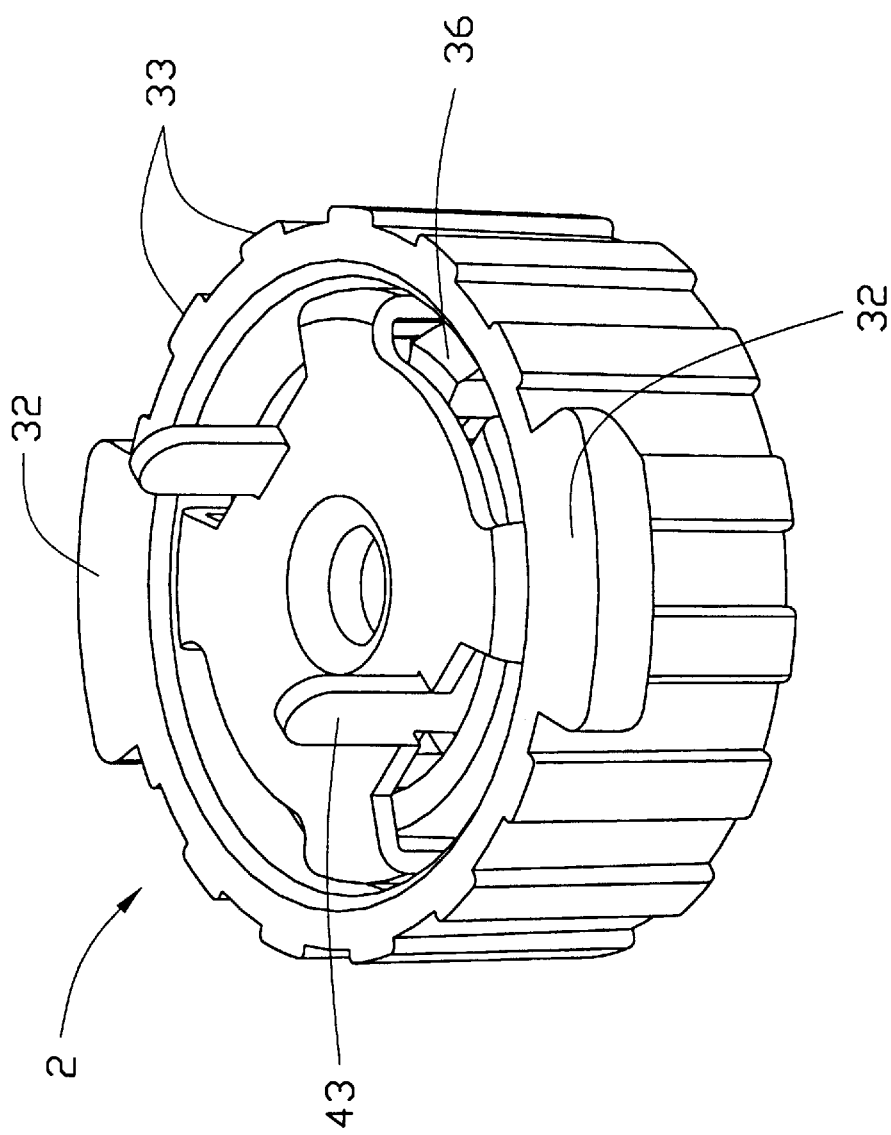
FIG. 3 is an assembled view of the first locking means of FIG. 2.

Referring to FIGS. 3 and 4, the pin-contained member 4 may be forcedly inserted into the cap 3, with the locking pins 43 extending beyond a virtual surface of the cap 3. Referring to FIG. 5, the cap 3 has two cantilever hooks 36 allowing the side walls 41 of the pin-contained member 4 to wipe therethrough and then retaining the pin-contained member 4 in the cap 3 by loosely abutting against a lower periphery 42 of the slot 40. The cap 3 and the pin-contained member 4 may have relative rotation movement with each other without pulling the pin-contained member 4 out of the cap 3 due to the loosely abutting relation between the cantilever hooks 36 and the lower periphery 42 of the slot 40.

Figure 6:
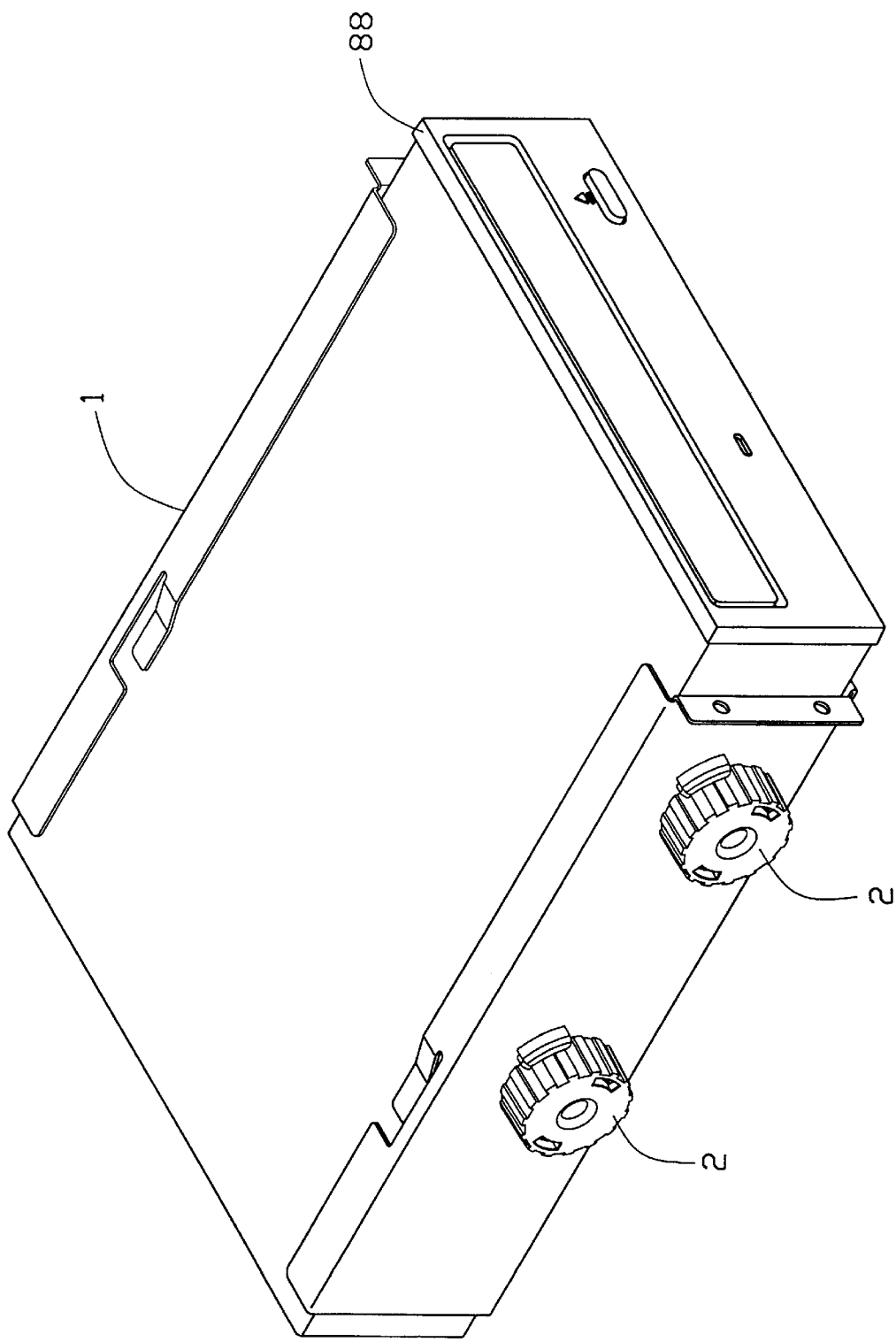
FIG. 6 is an assembled view of FIG. 1.
Figure 7:
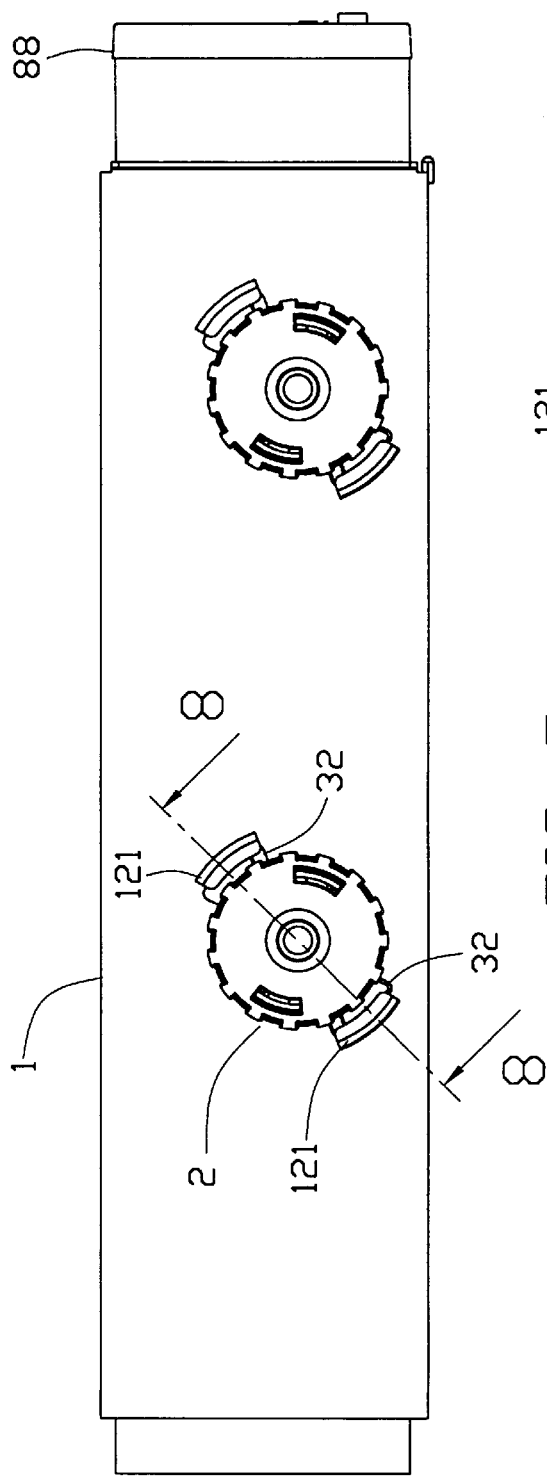
FIG. 7 is an enlarged side view of FIG. 6 for more clearly showing the first locking means.
Figure 8:
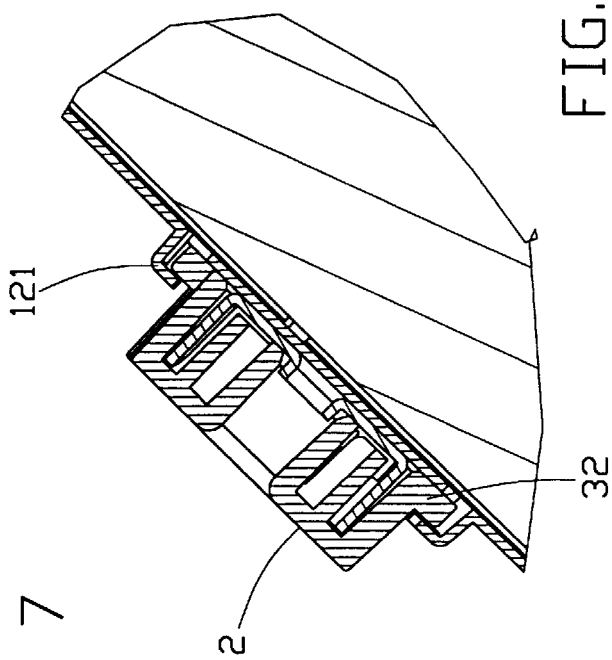
FIG. 8 is a cross-sectional view of FIG. 7 taken from a phantom line 8—8 thereof.

Further referring to FIGS. 1 to 3, the storage device 88 maybe fixed to the bracket 1 by the following steps. Firstly, slide the storage device 88 into the reception space 10 of the bracket land register the holes 80, 120. Secondly, connect the holes 80, 120 with the locking pin 43 of the first locking means 2. Thirdly, rotate the cap 3 of the first locking means 2 via the ribs 33 until the flanges 32 are forcedly engaged with the positioning tabs 121 as shown in FIGS. 6, 7, and 8.

The pin-contained member 4 remains stationary when the cap 3 is rotated to engage with the tabs 121'.

When the storage device 88 is needed to be disassembled from the bracket 1, a technician or a user merely needs to rotate the cap 3 out off the engagement with the tabs 121, pull out the first locking means 2 from the bracket 1, and slide the storage device 88 out of the reception space 10 of the bracket 1.

The above discussed is the first embodiment of the bracket. For providing variety of embodiments, a second embodiment is also shown referred to FIGS. 9 to 12, wherein the same parts or members are designated with the same numerals with those used in the first embodiment.

Figure 9:
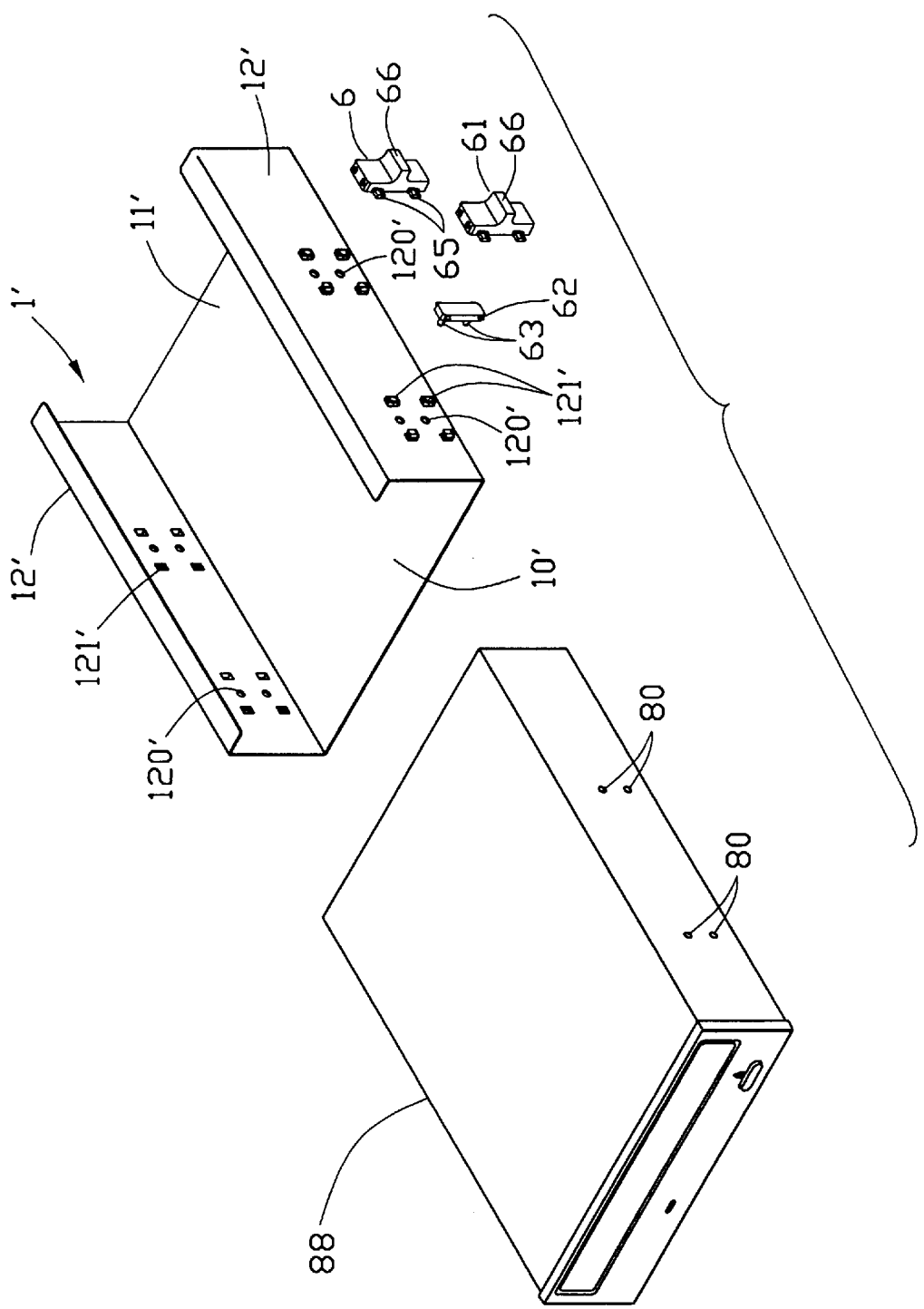
FIG. 9 s an exploded view of the bracket in accordance with a second embodiment of the present invention and the external storage device is also included for engagement with the bracket.

Particularly referring to FIG. 9, a bracket 1' of the second embodiment comprises a bottom 11' and two side walls 12' extending upward from opposite edges of the bottom 11' thereby defining a reception space 10' therebetween. Two sets of positioning holes 120' are defined in each side wall 12' and in this embodiment, each set including two holes 120'. Four tabs 121' are formed around each set of the positioning holes 120'. Four second locking means 6 are prepared for fixing the storage device 88 to the bracket 1'.

Also referring to FIGS. 10 and 11, each second locking means 6 comprises a plastic rectangular cap 61 and a pin-contained member 62 movably received in the cap 61. The cap 61 comprises a rib 66 protruding from a top surface thereof and four flanges 650 extending from opposite side walls thereof. Each flange 65 has a tapered section 651 connected to a flat section 652 and a recess 650 is defined in the tapered section 651. The tapered section 651 is used for facilitating engagement with the tab 121'. The recess 650 is formed to receive a dimple (not shown) formed in the tab 121'. The pin-contained member 62 is a metal plate having two locking pins 63 extending therefrom. The pin-contained member 62 may be forcedly inserted into the cap 61, with the locking pins 63 extending out of the cap 61. Particularly referring to FIG. 10, a sliding space 60 remains when the pin-contained member 62 is received in the cap 61 for providing relative movement space between the cap 61 and the pin-contained member 62.

Figure 12:
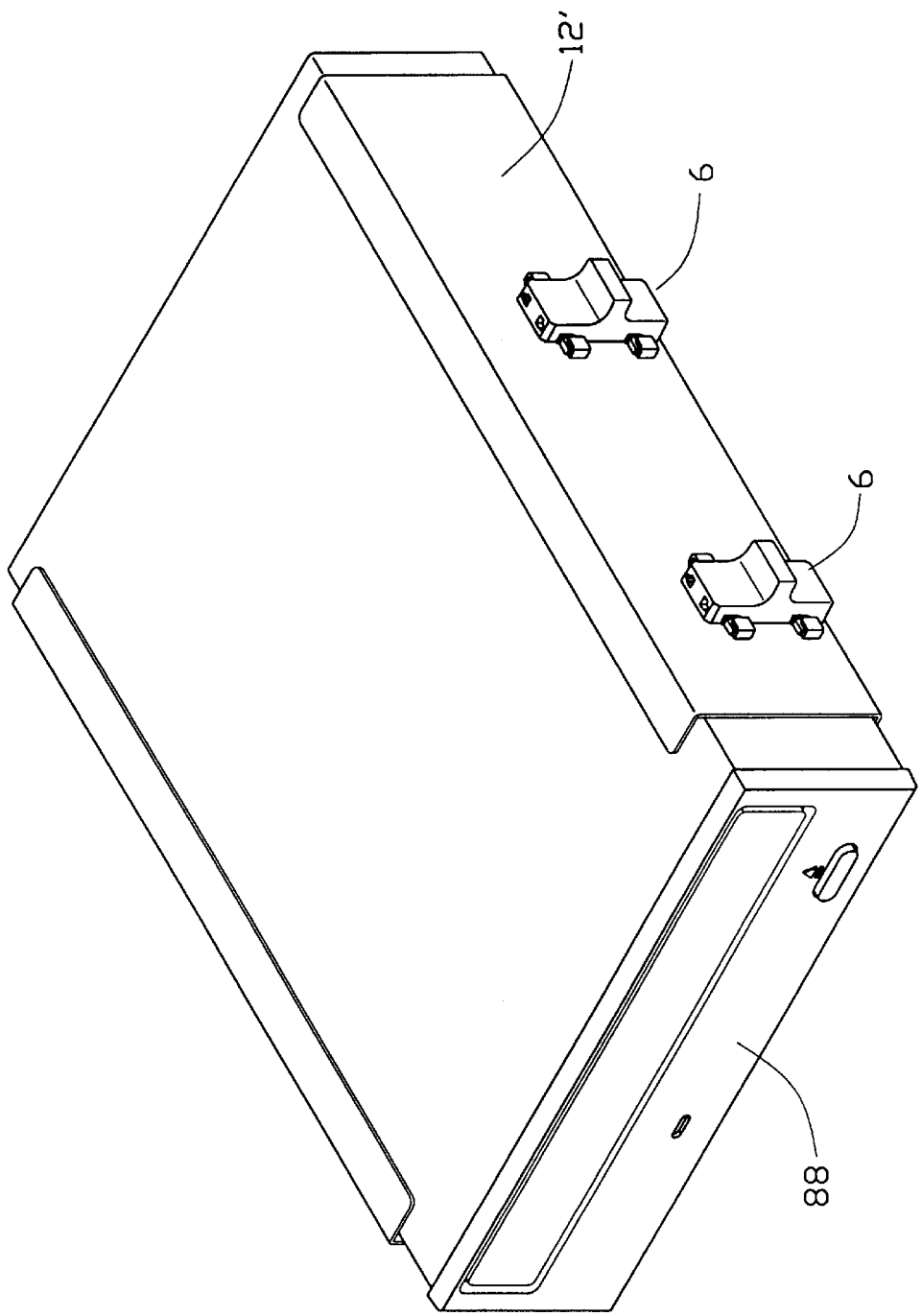
FIG. 12 is an assembled view of the bracket and the storage device of FIG. 9.

During assembling, the storage device 88 is firstly slid into the reception space 10' until the holes 120' and 80 are registered with each other. Secondly, the locking pin 63 of the second locking means 6 is inserted into the registered holes 120', 80 for engaging the bracket 1' with the storage device 88. Thirdly, the cap 61 is moved by operating on the rib 66 until the flanges 65 are forcedly engaged with the tabs 121' as shown in FIG. 12. The pin-contained member 62 remains stationary when the cap 61 is moved to engage with the tabs 121'.

When the storage device 88 is needed to be disassembled from the bracket 1', a technician or user merely needs to move the cap 61 out off the engagement with the tabs 121', pull out the second locking means 6 from the bracket 1', and slide the storage device 88 out of the reception space 10' of the bracket 1'.

While the present invention has been described with reference to a specific embodiment, the description is illustrative of the invention and is not to be construed as limiting the invention. Therefore, various modifications to the present invention can be made to the preferred embodiment by those skilled in the art without departing from the true spirit and scope of the invention as defined by the appended claims.

What is claimed is:

1. A bracket assembly having a releasable locking means for fixing an external storage device having a positioning hole therein, the bracket assembly comprising:

a U-shaped bracket having a bottom and two side walls extending from the bottom, each side wall defining a locking hole therein and having a tab formed beside the locking hole;

the releasable locking means comprising a cap and a pin-contained member movably received in the cap, the pin-contained member having a pin extending out of the cap, the cap having a flange extending from a peripheral wall thereof;

wherein the locking pin of the releasable locking means is removably retained in the locking hole of the bracket and the positioning hole of the storage device and the flange of the cap is detachably engaged with the tab of the bracket by moving the cap with respect to the pin-contained member.

2. The bracket assembly as claimed in claim 1 further comprising a rib formed on a surface of the cap for facilitating movement of the cap with respect to the pincontained member.

3. A bracket assembly having a releasable locking means for fixing an external storage device having a positioning hole therein, the bracket assembly comprising:

a U-shaped bracket having a bottom and two side walls extending from the bottom, each side wall defining a locking hole therein and having a tab formed beside the locking hole;

the releasable locking means comprising a cap and a pin-contained member rotatably retained in the cap, the pin-contained member having a pin extending out of the cap, the cap having a flange extending from a peripheral wall thereof;

wherein the locking pin of the releasable locking means is removably retained in the locking hole of the bracket and the positioning hole of the storage device and the flange of the cap is detachably engaged with the tab of the bracket by rotating the cap with respect to the pin-contained member.

4. The bracket assembly as claimed in claim 3, wherein the cap has a cantilever hook formed therein abutting against the pin-contained member when the pin-contained member is rotated with respect to the cap.

5. The bracket assembly as claimed in claim 4, wherein the cap has a plurality of ribs formed on a periphery thereof.

6. The bracket assembly as claimed in claim 5, wherein the pin-contained member has plate from which the pin and a peripheral wall extend to opposite directions.

7. The bracket assembly as claimed in claim 6, wherein the pin-contained member has a slot defined partially in the plate and partially in the peripheral wall.

8. The bracket assembly as claimed in claim 7, wherein the cap is a circular cap.

9. A bracket assembly having a releasable locking means for fixing an external storage device having a positioning hole therein, the bracket assembly comprising:

a U-shaped bracket having a bottom and two side walls extending from the bottom, each side wall defining a locking hole therein and having a tab formed beside the locking hole;

the releasable locking means comprising a cap and a pin-contained member slidably retained in the cap, the pin-contained member having a pin extending out of the cap, the cap having a flange extending from a peripheral wall thereof;

wherein the locking pin of the releasable locking means is removably retained in the locking hole of the bracket and the positioning hole of the storage device and the flange of the cap is detachably engaged with the tab of the bracket by sliding the cap with respect to the pin-contained member.

10. The bracket assembly as claimed in claim 9, wherein the cap is a rectangular cap.

11. The bracket assembly as claimed in claim 10, wherein the cap has a rib formed on a top surface thereof.

12. In combination of a bracket assembly comprising:

a bracket defining a plurality of locking holes in two side walls thereof and at least a tab formed adjacent to each of said locking holes;

an external storage device positioned between said two side walls and including therein a plurality of positioning holes in alignment with the corresponding locking holes;

releasable locking means including a cap and a pin-contained member retainably enclosed in said cap, said pin-contained member including a pin extending out of a bottom portion of the cap and perpendicular to a flange of the cap extending around said bottom portion;

the locking pin extending through the locking hole and the positioning hole to fix the external storage device to the bracket; wherein the cap is either rotated or slid with regard to both the pin-contained member and the bracket to have the flange latchably engaged with the tag.

* * * * *